(12) United States Patent
Kanamarlapudi et al.

(10) Patent No.: US 11,770,733 B2
(45) Date of Patent: Sep. 26, 2023

(54) METHODS AND SYSTEM FOR MANAGING UPLINK BUFFER AT USER EQUIPMENT IN TETHERED CALL MODE

(71) Applicant: QUALCOMM Incorporated, San Diego, CA (US)

(72) Inventors: Sitaramanjaneyulu Kanamarlapudi, San Diego, CA (US); Alok Mitra, San Diego, CA (US); Vamsi Dokku, San Diego, CA (US); Aditya Namjoshi, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/525,303

(22) Filed: Nov. 12, 2021

(65) Prior Publication Data

US 2022/0167205 A1  May 26, 2022

Related U.S. Application Data

(60) Provisional application No. 63/198,914, filed on Nov. 20, 2020.

(51) Int. Cl.
*H04W 28/02* (2009.01)
*H04L 1/1607* (2023.01)
(Continued)

(52) U.S. Cl.
CPC ....... *H04W 28/0278* (2013.01); *H04L 1/1607* (2013.01); *H04L 43/0864* (2013.01); *H04W 24/08* (2013.01); *H04W 28/0289* (2013.01)

(58) Field of Classification Search
CPC ... H04L 1/1607; H04L 1/1671; H04L 1/1835; H04L 1/1854; H04L 43/0864;
(Continued)

(56) References Cited

U.S. PATENT DOCUMENTS

| | | | |
|---|---|---|---|
| 8,180,902 B1 * | 5/2012 | Day | H04L 69/163 709/227 |
| 9,106,479 B1 * | 8/2015 | Mukerji | H04L 69/16 |

(Continued)

FOREIGN PATENT DOCUMENTS

| | | |
|---|---|---|
| WO | 2018036613 A1 | 3/2018 |
| WO | 2019238252 A1 | 12/2019 |

OTHER PUBLICATIONS

International Search Report and Written Opinion—PCT/US2021/059305—ISA/EPO—dated Mar. 3, 2022.

*Primary Examiner* — Pao Sinkantarakorn
(74) *Attorney, Agent, or Firm* — Haynes and Boone, LLP

(57) ABSTRACT

Wireless communications systems and methods related to uplink buffer management are provided. In some aspects, a user equipment receives a synchronization acknowledgment message destined for a device tethered to the user equipment and transmitted by an application server at a network to which the user equipment is connected. In some aspects, the synchronization acknowledgment message includes an application server receiver window size indicating available buffer space in a receive buffer of the application server. The user equipment can modify the application server receiver window size in the received synchronization acknowledgment message prior to transmitting the received synchronization acknowledgment to the tethered device.

28 Claims, 7 Drawing Sheets

(51) Int. Cl.
*H04L 43/0864* (2022.01)
*H04W 24/08* (2009.01)

(58) Field of Classification Search
CPC .. H04L 69/16; H04W 24/08; H04W 28/0278; H04W 28/0289; H04W 88/04
See application file for complete search history.

(56) References Cited

U.S. PATENT DOCUMENTS

| | | |
|---|---|---|
| 2009/0157866 A1 | 6/2009 | Sridharan et al. |
| 2016/0359681 A1 | 12/2016 | McGleenon et al. |
| 2016/0380898 A1 | 12/2016 | Englund et al. |
| 2020/0084130 A1 | 3/2020 | Mokkapati et al. |
| 2021/0203728 A1* | 7/2021 | Branch ................. H04L 1/1854 |

\* cited by examiner

METHODS AND SYSTEM FOR MANAGING UPLINK BUFFER AT USER EQUIPMENT IN TETHERED CALL MODE

CROSS REFERENCE TO RELATED APPLICATIONS

The present application claims priority to and the benefit of the U.S. Provisional Patent Application No. 63/198,914, filed Nov. 20, 2020, titled "Methods and System for Managing Uplink Buffer at User Equipment in Tethered Call Mode," which is hereby incorporated by reference in its entirety as if fully set forth below and for all applicable purposes.

TECHNICAL FIELD

The present disclosure relates generally to communications systems, and more particularly, to buffer management of at a user equipment tethered to a personal device.

INTRODUCTION

Wireless communication systems are widely deployed to provide various telecommunication services such as telephony, video, data, messaging, and broadcasts. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

These multiple access technologies have been adopted in various telecommunication standards to provide a common protocol that enables different wireless devices to communicate on a municipal, national, regional, and even global level, examples of such telecommunication standards including 5G New Radio (NR) standard and the 4G Long Term Evolution (LTE) standard.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some aspects of the present disclosure disclose a method of wireless communication performed by a user equipment (UE). In some aspects, the method comprises receiving a synchronization acknowledgment (SYN-ACK) message destined for a device tethered to the UE and transmitted by an application server at a network to which the UE is connected. In some aspects, the SYN-ACK message includes an application server receiver window size indicating available buffer space in a receive buffer of the application server. Further, the method comprises modifying the application server receiver window size in the received SYN-ACK message prior to transmitting the received SYN-ACK to the tethered device.

In some aspects, a user equipment (UE) comprises a memory; a transceiver; and at least one processor coupled to the memory and the transceiver. In some aspects, the transceiver is configured to receive a synchronization acknowledgment (SYN-ACK) message destined for a device tethered to the UE and transmitted by an application server at a network to which the UE is connected. In some aspects, the SYN-ACK message includes an application server receiver window size indicating available buffer space in a receive buffer of the application server. Further, in some aspects, the at least one processor is configured to modify the application server receiver window size in the received SYN-ACK message prior to transmitting the received SYN-ACK to the tethered device.

In some aspects, a non-transitory computer-readable medium (CRM) has program code recorded thereon for wireless communication by a user equipment (UE). In some aspects, the program code comprises code for causing the UE to receive a synchronization acknowledgment (SYN-ACK) message destined for a device tethered to the UE and transmitted by an application server at a network to which the UE is connected. In some aspects, the SYN-ACK message including an application server receiver window size indicating available buffer space in a receive buffer of the application server. Further, in some aspects, the program code comprises code for causing the UE to modify the application server receiver window size in the received SYN-ACK message prior to transmitting the received SYN-ACK to the tethered device.

In some aspects, a user equipment (UE) comprises means for receiving a synchronization acknowledgment (SYN-ACK) message destined for a device tethered to the UE and transmitted by an application server at a network to which the UE is connected. In some aspects, the SYN-ACK message includes an application server receiver window size indicating available buffer space in a receive buffer of the application server. Further, in some aspects, the UE comprises means for modifying the application server receiver window size in the received SYN-ACK message prior to transmitting the received SYN-ACK to the tethered device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
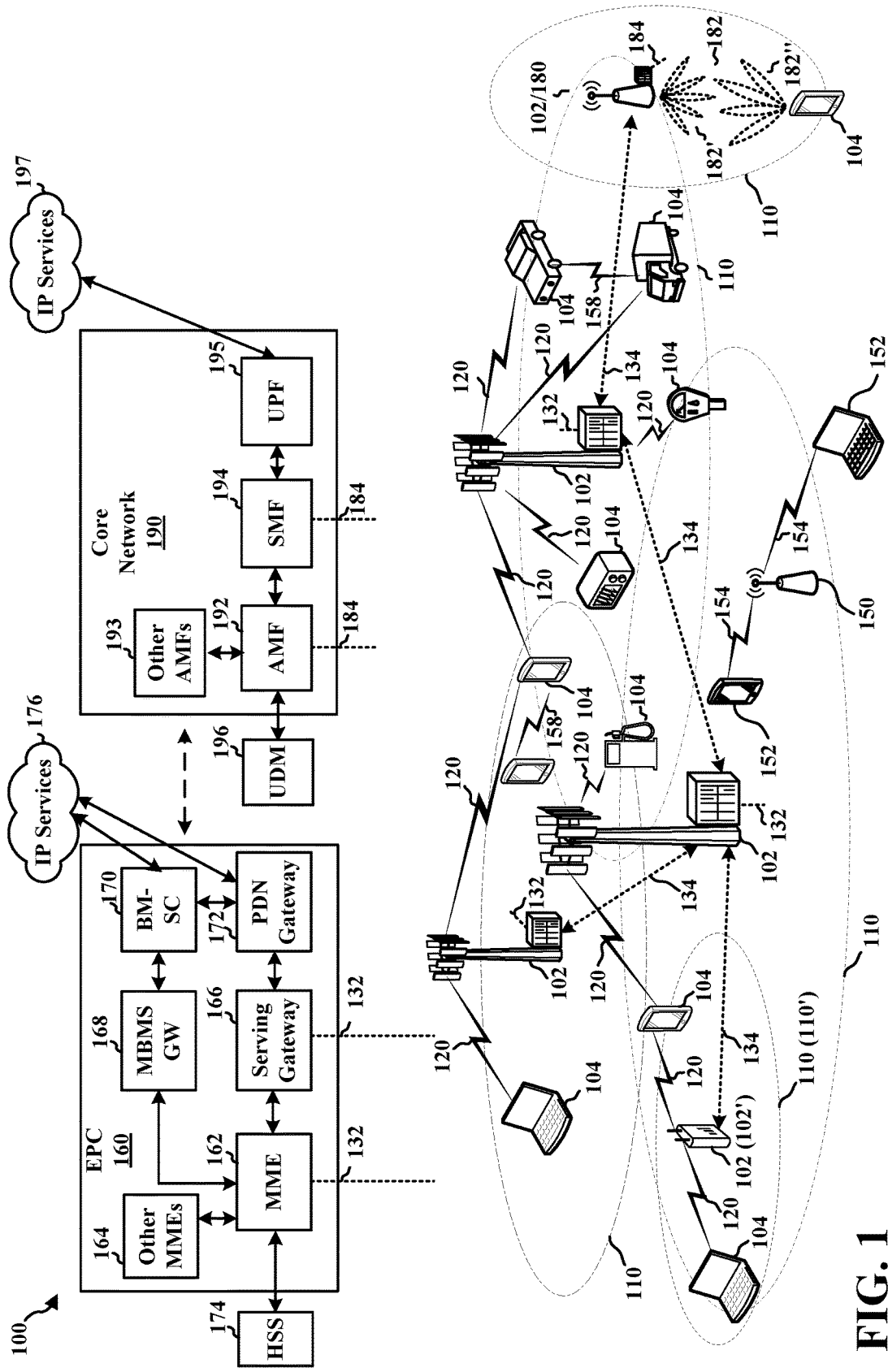
FIG. 1 is a diagram illustrating an example wireless communications system and an access network according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 according to some aspects of the present disclosure. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Figure 2:
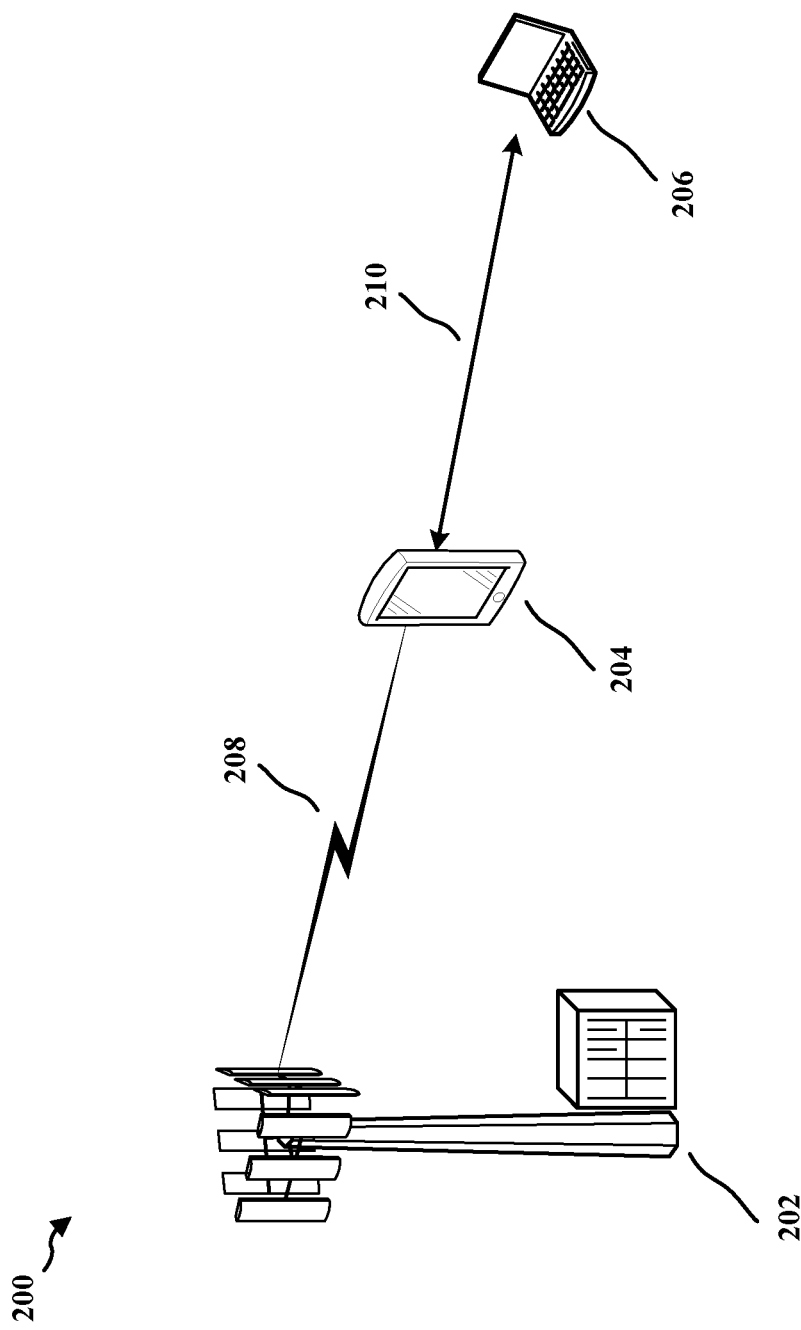
FIG. 2 is a diagram illustrating tethering of a device to a UE according to some aspects of the present disclosure.

In some cases, some of the UEs may obtain or establish connection to the radio network via another UE, i.e., the devices may be tethered to the other device (e.g., the tethered UEs may lack their own direct connection to the radio network or a connection to the radio network via the tethering UE may be preferred, for instance, because of a stronger or cheaper connection). For example, FIG. 2 shows an example diagram illustrating the tethering of a device 206 such as a personal computer (PC) to a UE 204, according to some aspects of the present disclosure. In some aspects, the UE 204 may be connected to the base station (BS) 202 in tethered call mode, where data is exchanged between a client or application in the tethered device 206 and a client or application in an application server communicating with the tethered device 206 via the UE 204 (and its connection 208 to the BS 202). In some aspects, the tethered device 210 may be connected to the UE 204 via a communication link such as but not limited to a universal serial bus (USB) cable, an ethernet cable, a Bluetooth® connection or a Wi-Fi® connection. In some cases, the UE 204 effectively serves as a modem for the communication between the tethered device 206 and the BS 202 (and the application server on which is executing an application communicating with the tethered device 206 via the UE 204). In some aspects, the tethered device 206 can be a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

In some aspects, the UE 204 or modem may maintain buffers to regulate the data that is being exchanged between the tethered device 206 and the BS 202. In some cases, the UE 204 or modem may maintain buffers to have enough data to indicate a buffer status report (BSR) to the BS 202 to, for instance, receive grant from the BS 202 to communicate the data to the BS 202. In some aspects, the UE 204 may also maintain a data flow control (FC) mechanism to manage the flow of data between the UE 204 or modem and the tethered device 206 (e.g., and client or application executing thereon and communicating with the BS 202). For instance, the UE 204 or modem may include a FC component (e.g., FC 414 in FIG. 4) that manages the amount of data in a buffer in the UE 204 that is being exchanged between the tethered device 206 and the BS 202.

Returning now to FIG. 1, in some aspects, the wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure and accompanying drawings may be focused on 5G New Radio (NR), the concepts described herein may be applicable to other similar areas, such as LTE, LTE-Advanced (LTE-A), Code Division Multiple Access (CDMA), Global System for Mobile communications (GSM), and/or other wireless/radio access technologies.

Figure 3:
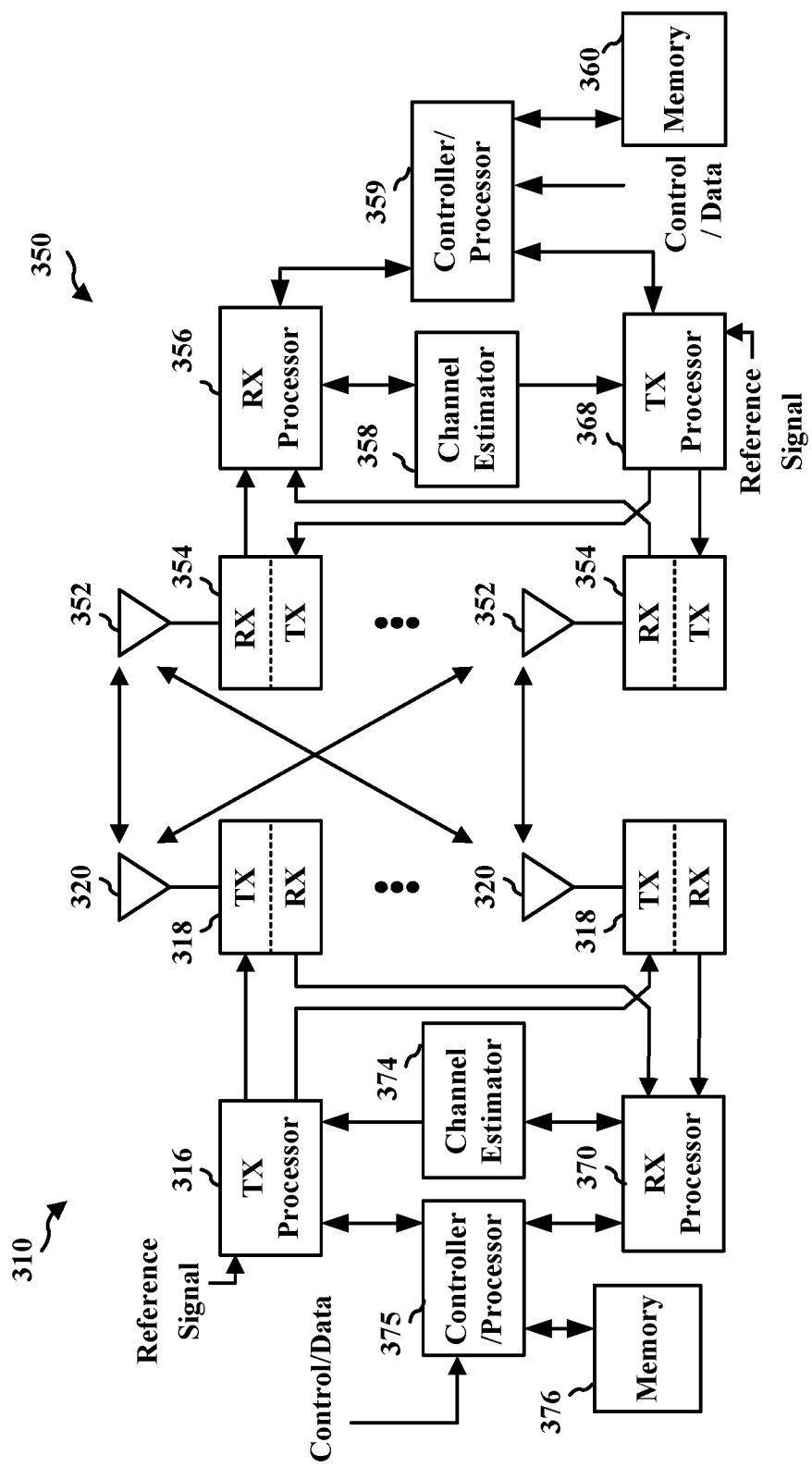
FIG. 3 is a diagram illustrating an example of a base station (BS) and user equipment (UE) in an access network according to some aspects of the present disclosure.

FIG. 3 is a block diagram of a base station (BS) 310 in communication with a UE 350 in an access network according to some aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to various aspects of the present disclosure, at least one of the TX processor 368, the RX processor 356, and/or the controller/processor 359 may be configured to perform aspects in connection with FIG. 1. For example, the RX processor 356 may receive a synchronization acknowledgment (SYN-ACK) message destined for a device tethered to the UE and transmitted by an application server at a network to which the UE is connected. In some aspects, the SYN-ACK message may include an application server receiver window size indicating available buffer space in a receive buffer of the application server. Further, in some aspects, the controller/processor 359 may modify the receiver window size in the received SYN-ACK message prior to re-transmitting (e.g., forwarding, transmitting, communicating, etc.) the received SYN-ACK to the tethered device.

Figure 4:
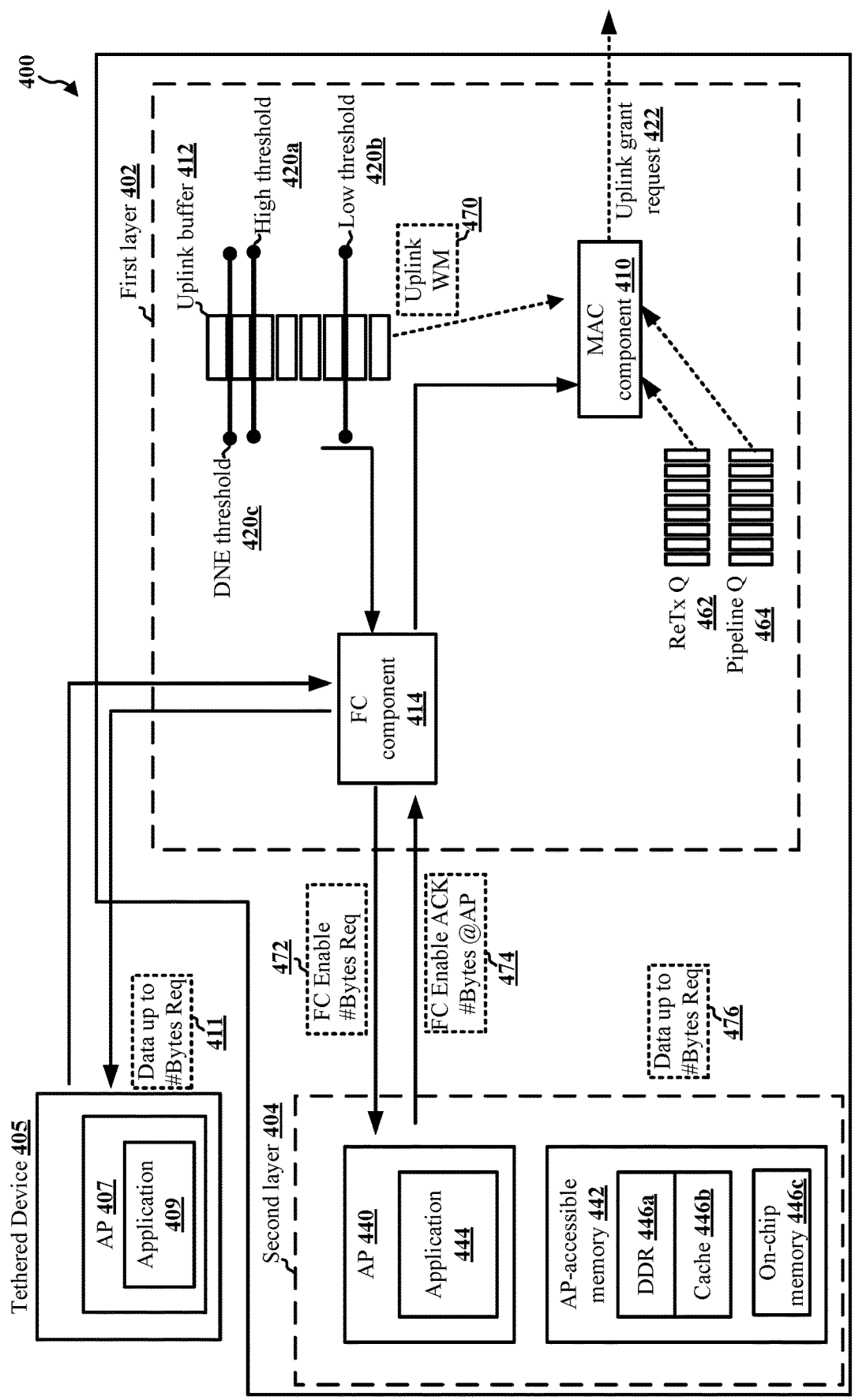
FIG. 4 is a block diagram illustrating an example architecture of a UE connected to a tethered device according to some aspects of the present disclosure.

FIG. 4 is a block diagram illustrating an example architecture of a UE 400 connected to a tethered device 405 according to some aspects of the present disclosure. The architecture of the UE 400 may include multiple protocol stack layers, including a first layer 402 and a second layer 404. While the architecture of the UE 400 illustrates two layers, additional and/or different layers may be present in different aspects without departing from the scope of the present disclosure.

The first layer 402 may include L2 functionality, such as a PDCP layer, an RLC layer, and/or a MAC layer. For example, the first layer 402 may include a MAC component 410, which may implement various functionality of the MAC layer. In some aspects, the first layer 402 may include more than one layer, including Layer 3 (L3), L2, and/or Layer 1 (L1) (e.g., L1 may include a PHY layer). For example, the first layer 402 may represent one or more layers that are procedurally below the second layer 404 in the protocol stack of the architecture of the UE 400.

Illustratively, the first layer 402 may include a flow control (FC) component 414. The FC component 414 may be implemented in hardware, software, firmware, or a combination thereof. The FC component 414 may manage at least a portion of the data flow between the first layer 402 and the second layer 404. For example, the FC component 414 may control the flow of packets from the second layer 404 to the first layer 402.

The first layer 402 may further include a MAC component 410. The MAC component 410 may be implemented in hardware, software, firmware, or a combination thereof. The MAC component 410 may encapsulate data (e.g., packets) from an uplink buffer 412 in TBs sent during transmission time intervals (TTIs) scheduled according to an uplink grant.

The second layer 404 may include at least one layer that is procedurally implemented above the first layer 402. For example, the second layer 404 may include an application layer. Accordingly, the second layer 404 may include an application 444, the instructions of which may be executed by an application processor (AP) 440.

Each of the first layer 402 and the second layer 404 may include memory in which to queue data for transmission over a wireless network. According to various aspects, the first layer 402 may include an uplink buffer 412, a retransmission queue 462, and an L2 pipeline queue 464. The uplink buffer 412 may include an L2 buffer and/or modem buffer that may queue data for encapsulation in MAC TBs and, therefore, the uplink buffer 412 may be configured to queue data received from a higher layer (e.g., the second layer 404) to be transmitted over the wireless network. The retransmission queue 462 may be configured to queue data that is to be retransmitted, such as packets that are dropped, corrupted, and/or negatively acknowledged (e.g., NACK'ed). The L2 pipeline queue 464 may be configured to queue data of lower layer(s) (e.g., the first layer 402) that is to be transmitted over the wireless network, such as uplink control information, HARQ ACK/NACK data, etc. The aggregate data in the uplink buffer 412, the retransmission queue 462, and the L2 pipeline queue 464 may be collectively referred to as L2 data.

At the second layer 404, the AP 440 may be communicatively coupled with an AP-accessible memory 442. The AP-accessible memory 442 may queue data (e.g., packets) that is to be transmitted over the wireless network, e.g., for the application 444. Data queued in the AP-accessible memory 442 may include application data 476 generated in association with execution of the application 444 by the AP 440. In some cases, the data queued in the AP-accessible memory 442 may include the application data 411 or other data associated with the tethered device 405 (e.g., when data is communicated between the tethered device 405 and the application server via the UE 400).

The AP-accessible memory 442 may have a capacity that is greater than the uplink buffer 412. For example, the AP-accessible memory 442 may be configured to queue approximately two or three megabytes (MB) of data, whereas the uplink buffer 412 may be configured to queue approximately 512 kilobytes (kB) of data. However, other capacities are possible in other aspects.

In one aspect, the AP-accessible memory 442 may include double data rate (DDR) synchronous dynamic random-access memory (SDRAM) 446a. The DDR SDRAM 446a may be attached to a system cache 446b. The AP 440 may be configured to queue application data 476 in the system cache 446b, and defer queuing application data 476 in the DDR SDRAM 446a (e.g., until the system cache 446b is flushed).

In one aspect, the AP-accessible memory 442 may additionally or alternatively include on-chip memory 446c. The AP 440 may be configured to queue application data 476 in the on-chip memory 446c. If the system cache 446b is limited (e.g., due to current operations, such as video/graphics processing by the UE 400), then the on-chip memory 446c may be used as an addition and/or alternative to the system cache 446b. For example, the on-chip memory 446c may provide overflow support when the system cache 446b is at or near capacity. That is, the AP 440 may queue application data 476 in the system cache 446b until the system cache 446b is at or near capacity, and then the AP 440 may switch to queuing application data 476 in the on-chip memory 446c (e.g., until the system cache 446b is flushed).

In some aspects, the tethered device 405 may be tethered to the UE 400 so that the tethered device can use the UE 400 as a modem to connect to the network or base station to which the UE 400 is connected and exchange data with an external or remote application server via the BS. In some aspects, the tethered device 405 may include an application layer. For example, the tethered device 405 may include an application 409, the instructions of which may be executed by an application processor (AP) 407. The AP 407 may also be communicatively coupled with an AP-accessible memory (not shown). The AP-accessible memory may queue data (e.g., packets) that is to be transmitted over the communication link (e.g., linking or tethering the tethered device to the UE) to transfer the queued data to the external or remote application server via the UE 400. Data queued in the AP-accessible memory may include application data 411 generated in association with execution of the application 409 by the AP 407. For example, the data can be transmission control protocol (TCP) acknowledgment (ACK) messages generated in response to TCP data packets received at the tethered device 405 in a downlink transmission from the external or remote application server via the BS and the UE 400.

A size of data or amount of data queued in memory may be referred to as a watermark (WM). Each WM may be expressed in a byte size (e.g., bytes, kB, and/or MB) and a respective WM may correspond to a data size currently queued in one of the AP-accessible memory 442 or memory of the tethered device 405, the uplink buffer 412, the retransmission queue 462, or the L2 pipeline queue 464. For example, the data size in the uplink buffer 412 may be referred to as an uplink WM 470, and the uplink WM 470 may fluctuate as the uplink buffer 412 is drained and refilled.

In some aspects, multiple thresholds may be configured in association with the uplink buffer 412. For example, the uplink buffer 412 may be configured with a high threshold 420a, a low threshold 420b, and/or a do not exceed (DNE) threshold 420c. One or more of these thresholds 420a-c may be configured by a 3GPP mode handler based on an RRC configuration that is indicated to the UE 400 (e.g., via RRC signaling) and/or may be dynamically configured (e.g., based on observing historical trends associated with draining and refilling the uplink buffer 412). The thresholds 420a-c may be compared with the uplink WM 470.

According to an aspect, the FC component 414 may monitor and manage one or more of the thresholds 420a-c. The FC component 414 may send one or more messages 472 to the AP 440. The AP 440 may send one or more messages 474 to the FC component 414. For example, when the DNE threshold 420c is reached (e.g., the uplink WM 470 is equal to or exceeds the DNE threshold 420c), the FC component 414 may signal the AP 440 to cease sending data to the uplink buffer 412. Therefore, the AP 440 may continue to queue data that is to be sent over the wireless network (e.g., data from the application 444) at AP-accessible memory 442 and/or the AP 440 may allocate other memory in which to queue the data while the uplink buffer 412 is emptied (e.g., by transmitting or otherwise removing the data in the uplink buffer 412). When the DNE threshold 420c is reached, data sent from the AP 440 may be dropped because the uplink buffer 412 is at or near capacity.

As another example, when the DNE threshold 420c is reached, the FC component 414 may prevent or pause the data exchange, via the UE 400, between the tethered device 405 and the external or remote application server. For instance, the FC component 414 may close the communication link between the tethered device 405 and the UE 400 to prevent data from the tethered device 405 from arriving at the UE 400. When the DNE threshold 420c is reached, data sent from the AP 407 may be dropped because the uplink buffer 412 is at or near capacity. In some cases, the FC component 414 may also signal the tethered device 405 (e.g., the AP 407) to cease sending data to the uplink buffer 412.

In another example, when the low threshold 420b is reached (e.g., the uplink WM 470 is equal to or below the low threshold 420b), the FC component 414 may signal the AP 440 to resume sending data to the uplink buffer 412, e.g., from the AP-accessible memory 442.

In yet another example, when the high threshold 420a is reached (e.g., the uplink WM 470 is equal to or above the high threshold 420a), the FC component 414 may determine that no additional data should be queued in the uplink buffer 412. The FC component 414 may generate an FC message indicating that no more data should be sent to the first layer 402 to be queued in the uplink buffer 412. The FC component 414 may send such an FC message to the second layer 404 in order to instruct the AP 440 to refrain some sending additional data to the first layer 402.

In some aspects, when the uplink WM 470 is less than the high threshold 420a or the low threshold 420b, the FC component 414 may maintain the communication link between the tethered device 405 and the UE 400 open so that data may be transmitted from the tethered device to the remote or external application server via the UE 400. For instance, if the WM 470 falls below the high threshold 420*a* after reaching the high threshold 420*a* or the DNE threshold 420*c*, the FC component 414 may open the closed communication link so that data queued at the tethered device 405 may start flowing to the UE via the communication link (e.g., to be transferred via the UE and the BS the UE is connected to arrive at the remote or external application server). As noted above, an example of such data can be TCP ACK messages acknowledging downlink transmissions transmitted to the tethered device 405 by the application server. In some cases, when the low threshold 420*b* is reached (e.g., the uplink WM 470 is equal to or below the low threshold 420*b*), the FC component 414 may signal the AP 407 of the tethered device 405 to resume sending data to the uplink buffer 412.

In various aspects, the low threshold 420*b* may be configured to be approximately equal to a data size needed to serve T milliseconds (ms) worth of uplink peak rate transmission. By way of illustration, T may be equal to four ms, each TTI may be equal to 200 microseconds (µs), and the peak MAC TB size per TTI may be equal to eight kB. Therefore, the low threshold 420*b* may be configured as 160 kB, which is equal to T ms divided by the TTI duration multiplied by the peak TB size or, equivalently in this example, (4 ms/200 µs)*8 kB. In some aspects, the low threshold 420*b* may be configured to be greater than the data size needed to serve T ms worth of uplink peak rate transmission—e.g., the low threshold 420*b* may be configured as 200 kB.

The high threshold 420*a* may be configured to be greater than the low threshold 420*b*. For example, the high threshold 420*a* may be configured to be twice the low threshold, such as 400 kB. The DNE threshold 420*c* may be configured to be greater than the high threshold 420*a*. For example, the DNE threshold 420*c* may be configured to be 100 kB or 200 kB greater than the high threshold 420*a*. The thresholds 420*a-c* may be configured to have different values in other aspects.

When the uplink buffer 412 includes data, the uplink buffer 412 may be emptied. The MAC component 410 may determine the uplink WM 470 that indicates the data size currently queued in the uplink buffer 412. For example, the MAC component 410 may periodically poll the uplink buffer 412 to receive the uplink WM 470. In another example, the FC component 414 may indicate to the MAC component 410 that the uplink WM 470 has reached at least one of the high threshold 420*a* or the DNE threshold 420*c*, and the MAC component 410 may determine the uplink WM 470 based on the indication from the FC component 414.

Based on the uplink WM 470, the MAC component 410 may send, to a base station, an uplink grant request 422 in order to obtain an uplink grant for sending the data queued in the uplink buffer 412. The uplink grant request 422 may include a BSR or buffer occupancy report. For example, the uplink grant request 422 may be based on the uplink WM 470.

In addition to the uplink WM 470, the MAC component 410 may generate an uplink grant request 422 based on an amount of data (e.g., packets) in the retransmission queue 462 and/or the L2 pipeline queue 464. Thus, the MAC component 410 may generate the uplink grant request 422 based on the sum of the uplink WM 470, a WM of the AP-accessible memory 442, a WM of the memory of the tethered device 405, a WM of the retransmission queue 462, and a WM of the L2 pipeline queue 464.

Figure 5:
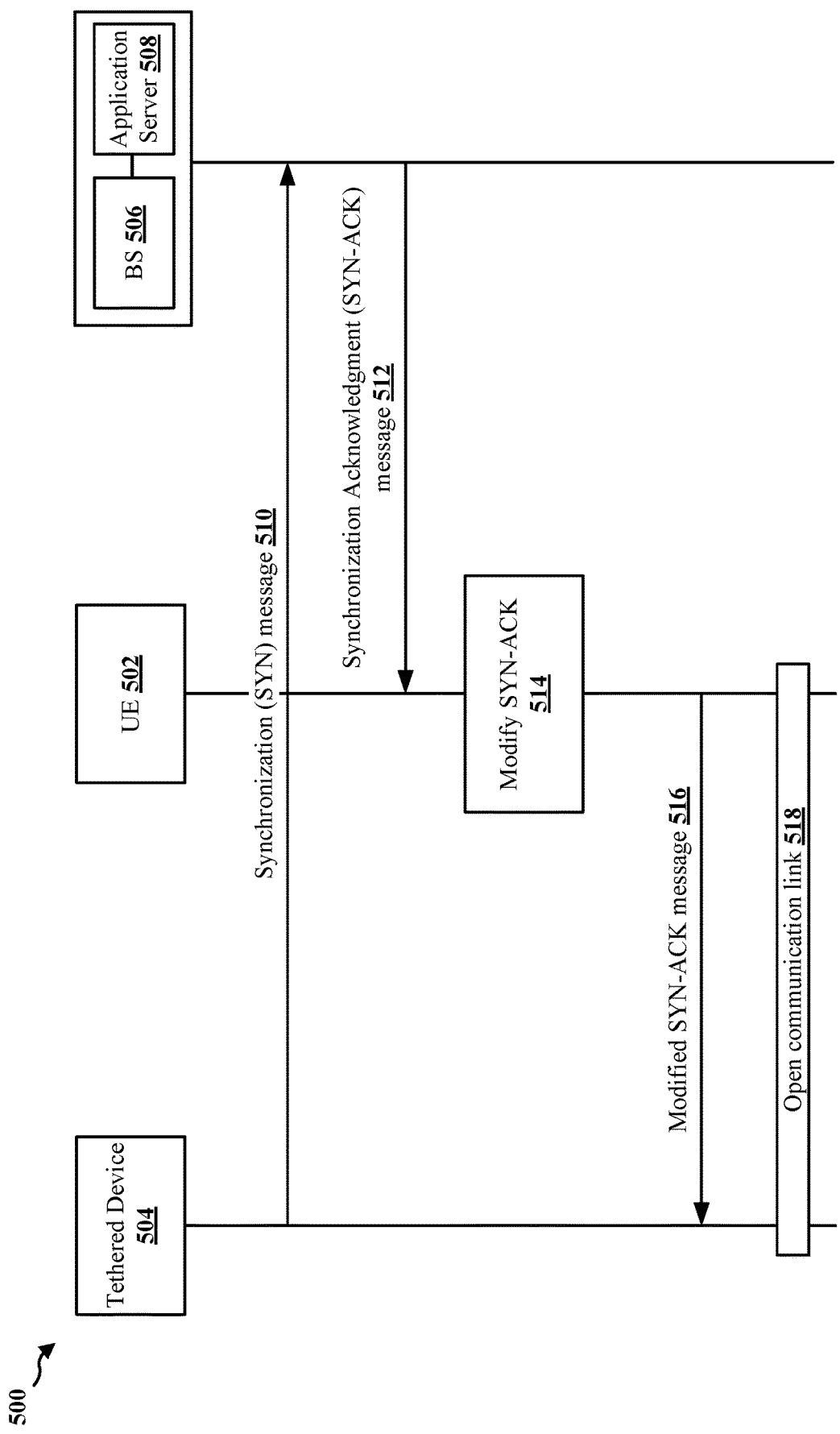
FIG. 5 is a signaling diagram illustrating uplink (UL) buffer management by a UE connected to a tethered device according to some aspects of the present disclosure.

FIG. 5 is a signaling diagram illustrating uplink (UL) buffer management by a UE connected to a tethered device according to some aspects of the present disclosure. The UE 502 can be the UE 104, UE 204, UE 350, or UE 400, the tethered device 504 can be tethered device 206, or tethered device 405 and the base station (BS) 506 can be the BS 102, BS 202, or BS 310. In some aspects, the tethered device 504 may be communicating or exchanging data with an application server 508 via the UE 502 and the BS 506 to which the application server 508 is connected. In some aspects, discussions herein related to the tethered device 504 establishing a connection to and communicating or exchanging data with the BS 506 via the UE 502 may also apply to, and is to be understood to include, the process of the tethered device 504 establishing the connection to and communicating or exchanging data with the application server 508 via the UE 502 and the BS 506 (e.g., as the application server may be part of or connected to the network of which the BS 5606 is a part).

In some aspects, the communication link linking the tethered device 504 to the UE 502 can be a universal serial bus (USB) cable, an ethernet cable, a Bluetooth® connection or a Wi-Fi® connection. In some aspects, the tethered device 206 can be a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

In some aspects, the tethered device 504 may use the UE 502 as a modem for connecting to the BS 506 to which the UE 502 is connected. In some aspects, the term "tethering" may refer to a device (e.g., such as the tethered device 504) using another device (e.g., such as the UE 502) as a modem to connect to a network to which the other device (i.e., the UE 502) is connected (e.g., and use the connection for data exchange). In some cases, the tethered device 504 may not have a connection to an application server coupled to a network (e.g., 5G NR, LTE, etc., network) of which the BS 506 is apart, and may use the UE 502 to connect to the application server. For instance, the application server may be a server hosting an application and the tethered device 504 may use the UE 502 to receive data generated by the application (e.g., videos, audio, etc.).

In some aspects, the transmission control protocol (TCP) establishing connection between the tethered device 504 and the BS 506 (e.g., and the application server 508 in connection with the BS 506) may be a three-way handshake where the tethered device 504 initiating the connection may transmit to the application server 508 a synchronization (SYN) message and the application server 508 may acknowledge the arrival of the SYN message to the tethered device 504 by transmitting to the tethered device 504 a synchronization acknowledgement (SYN-ACK) message in return. In some cases, after the connection is established between the tethered device 504 and the BS 506/application server 508, acknowledgments (ACKs) may be exchanged in response to received data transmissions. For example, TCP downlink transmissions including data packets may be transmitted from the application server 508 to the tethered device 504 via the UE 502 and the tethered device 504 may transmit back to the application server 508 via the UE 502 an ACK to acknowledge the arrival of the data packets.

In some aspects, the SYN message and the SYN-ACK messages exchanged between the tethered device 504 and the application server 508 as part of the establishment of a TCP connection therebetween may include parameters controlling data exchange between the tethered device 504 and the application server 508. For instance, the SYN message from the tethered device 504 to the application server 508 may include a receiver window size of the tethered device that indicates to the application server 508 the maximum amount of data that the tethered device 504 is configured to receive and buffer from the application server 508 (e.g., before having to send an ACK to the application server 508 as an acknowledgement of the received data). In some aspects, the SYN-ACK message from the application server 508 to the tethered device 504 may include a receiver window size of the application server 508 that indicates to the tethered device 504 the maximum amount of data that the application server 508 is configured to receive and buffer from the tethered device 504 (e.g., before having to send an ACK to the tethered device 504 as an acknowledgement of the received data), i.e., the available buffer space in the receive buffer of the application server 508.

In some aspects, as discussed above with reference to FIG. 4, the UE 502 may have associated therewith a buffer (e.g., an uplink (UL) buffer 412). For example, the UE 502 which serves as a modem for the tethered device 504 and facilitates the exchange of data between the tethered device 504 and the application server 508 may have an uplink buffer for UL data being transmitted from the tethered device 504 to the application server 508. In some aspects, the UE 502 may close the communication link between the tethered device 504 and the UE 502, or otherwise prevent the transmission of UL data from the tethered device 504, when the UL buffer of the UE 502 is full.

For example, the UL buffer of the UE 502 may have an UL buffer threshold associated therewith where when the uplink watermark of the UE 502, i.e., the amount of data in the buffer of the UE 502, exceeds the UL buffer threshold, the UE 502 closes the communication link between the UE 502 and the tethered device 504 so that data may not flow from the latter to the former until the communication link is opened back up again. In some cases, instead of or in addition to closing the communication link, the UE 502 may signal to the tethered device 504 to cease sending data to the UE 502 (e.g., data destined for the application server 508) until the UE 502 signals to the tethered device 504 otherwise. In some instances, the UL buffer threshold may include multiple thresholds (e.g., the low, high and DNE thresholds discussed with reference to FIG. 4) and the UE 502 may close the communication link and/or signal the tethered device 504 to cease sending additional data to the UE 502 when the WM of the buffer exceeds the high threshold or the DNE threshold.

In some aspects, when the WM of the UL buffer of UE 502 exceeds the UL buffer threshold, the communication link between the UE 502 and the tethered device 504 may repeatedly close and open dynamically and cause delay in the UL transmission of ACKs from the tethered device 504 to the application server 508. For example, the application server 508 and the tethered device may be communicating and an application executing on the application server 508 may transmit data packets as TCP DL transmission to the tethered device 504 via the BS 506 and the UE 502. For instance, the application server 508 may be transmitting the TCP DL data packets according to a schedule of downlink (DL) transmission per a prior DL grant.

Upon receiving the TCP DL data packets, in some cases, the tethered device 504 may generate a TCP ACK message to acknowledge the arrival of the TCP DL data packets and send the ACK to the UE 502 for further transmission to the application server 508. In such cases, if the buffering of the TCP ACK message (e.g., along with any other UL data transmitted by the tethered device 504) at the UL buffer of the UE 502 results in the WM of the UL buffer of UE 502 exceeding the UL buffer threshold, the UE 502 may receive at most a portion of the data transmitted by the tethered device 504 (e.g., the received at most portion being such that the WM does not exceed the UL buffer threshold) and close the communication link between the UE 502 and the tethered device 504 until the WM falls below the UL buffer threshold (e.g., in which case the UE 502 may reopen the communication link to allow at least some of the rest of the transmitted data arrive at the UL buffer of the UE 502). In some cases, this process may occur repeatedly, causing TCP ACKs transmitted by the tethered device 504 and destined for the application server 508 to be stalled at the UE 502, resulting in increased round trip time (RTT) between the tethered device 504 and the application server 508, which in turn may affect (e.g., delay or reduce) the scheduling of DL transmissions from the application server 508 to the tethered device 504. In some cases, RTT refers to the round trip time between a sender sending a data packet or signal to a receiver and receiving in return, from the receiver, an ACK acknowledging the arrival of the data packet or signal at the receiver. In some aspects, the UE may monitor the RTT of a communication cycle between the application server and the tethered device. In some aspects, the communication cycle may include data being transmitted by the application server via the UE to the tethered device and an acknowledgement being received at the application server after transmission via the UE by the tethered device in response to the data being received at the tethered device. In some aspects, the UE may determine, based on monitoring the RTT, that the RTT is increasing over time. In some cases, the UE may modify the application server receiver window size based on determining the RTT is increasing over time.

Some aspects of the present disclosure disclose a mechanism for UL buffer management of a UE such that UL transmissions from a device tethered to the UE destined for an external or remote application server are not stalled at the UE due to overflowing or full UL buffer at the UE. In some aspects, with reference to FIG. 5, a device 504 may be tethered to a UE 502 via a communication link such as but not limited to a USB cable, an ethernet cable, a Bluetooth® connection, a Wi-Fi® connection, etc., to use the UE 502 as a modem to establish a TCP connection to an application server 508 via the BS 506 to which the UE 502 is connected. In some aspects, to establish the TCP connection with the application server 508, the tethered device 504 may initiate a three-way handshake by transmitting to the application server 508 a SYN message 510 (e.g., via the UE 502 and the BS 506). In some instances, the SYN message 510 may include parameters of the tethered device 504 related to the transmission and reception of data at the tethered device 504, such as but not limited to tethered device send window size indicating available buffer space in a send buffer of the tethered device 504, tethered device receiver window size indicating available buffer space in a receive buffer of the tethered device 504 (e.g., the maximum amount of data that the tethered device 504 is configured to receive and buffer from the application server 508, for instance, before having to send an ACK to the application server 508 as an acknowledgement of the received data), etc. In some cases, the tethered device send window size may also be bounded by the receiver window size of the application server 508, i.e., the tethered device send window size may be no greater than the receiver window size of the application server 508 (e.g., besides being bounded by, i.e., being no greater than, the send buffer of the tethered device 504).

In some aspects, upon receiving the SYN message 510 from the tethered device 504, the application server 508 may generate a SYN-ACK message 512 that acknowledges the arrival of the SYN message 510 at the application server 508 and send the SYN-ACK 512 to the UE 502 for further transmission to the tethered device 504. In some aspects, the SYN-ACK message 512 may include parameters of the application server 508 related to the transmission and reception of data at the application server 508, such as but not limited to application server send window size indicating available buffer space in a send buffer of the application server 508, application server receiver window size indicating available buffer space in a receive buffer of the application server 508 (e.g., the maximum amount of data that the application server 504 is configured to receive and buffer from the tethered device 508, for instance, before having to send an ACK to the tethered device 504 as an acknowledgement of the received data), etc. In some cases, the application server send window size may also be bounded by the receiver window size of the tethered device 504, i.e., the application server send window size may be no greater than the receiver window size of the tethered device 504 (e.g., besides being bounded by, i.e., being no greater than, the send buffer of the application server 508).

In some aspects, upon receiving the SYN-ACK message 512 from the application server 508, the UE 502 may modify 514 the received SYN-ACK message 512 to alter at least some of the parameters of the application server 508 related to the transmission and reception of data at the application server 508. That is, in some aspects, the UE 502 may intercept at the UE 502 the SYN-ACK message 512 destined for the tethered device 504 and modify at least some of the parameters of the application server 508 related to the transmission and reception of data at the application server 508. In some cases, the modification to the parameters may comprise modifying the receiver window size of the application server 508 that is included in the SYN-ACK message 512. For example, the UE 502 may modify the received or intercepted SYN-ACK message 512 to change (e.g., reduce) the receiver window size of the application server 508 in the SYN-ACK message 512 so that the receiver window size may not exceed the UL buffer threshold of the UE 502. Further, because the tethered device send window size can be bounded by, i.e., can be no greater than, the receiver window size of the application server 508, modifying the receiver window size of the application server 508 in the SYN-ACK message 512 to be no greater than the UL buffer threshold of the UE 502 may result in the tethered device send window size also being no greater than the UL buffer threshold of the UE 502. That is, the UE 502 may modify the SYN-ACK message 512 by reducing the receiver window size of the application server 508 in the SYN-ACK message 512 to be no greater than the UL buffer threshold of the UE 502, which may result in tethered device send window size also being no greater than the UL buffer threshold of the UE 502.

In some aspects, after modifying 514 the SYN-ACK message 512 intercepted or received from the application server 508, the UE 502 may then send the modified SYN-ACK message 516 to the tethered device 504. In some aspects, after receiving the modified SYN-ACK message 516 from the UE 502, the tethered device 504 may limit the size of UL transmissions from the tethered device 504 to the application server 508 to be no greater than the UL buffer threshold of the UE 502 (e.g., because the tethered device send window size is bounded or limited by the reduced receiver window size of the application server 508 in the SYN-ACK message 512 that is modified by the UE 502, where the reduced receiver window size is reduced by the UE 502 to be no greater than the UL buffer threshold of the UE 502). As such, the WM of the UL buffer of UE 502 may not exceed the UL buffer threshold because of an UL communication from the tethered device to the application server 508, and the UE 502 may keep the communication link 518 between the tethered device 504 and the UE 502 open, which allows UL transmissions such as TCP ACK messages from the tethered device 504 acknowledging arrival at the tethered device 504 of TCP DL data packets transmitted by the application server 508 may be transmitted to the application server 508 without being stalled or delayed at the UE 502 because of a closed communication link (e.g., or a signal from the UE 502 to the tethered device 504 instructing the tethered device to cease transmissions of the TCP ACK messages).

In some aspects, the tethered device 504 may comprise multiple devices tethered to the UE 502. In such cases, the sum of the tethered device send window sizes of the multiple devices may be bounded or limited by the reduced receiver window size of the application server 508, which is reduced by the UE 502 to be no greater than the UL buffer threshold of the UE 502. As such, the WM of the UL buffer of UE 502 may not exceed the UL buffer threshold due to UL communications from the multiple tethered devices to the application server 508, and the UE 502 may keep the communication link 518 between the multiple tethered devices and the UE 502 open.

Although FIG. 5 shows modification to SYN-ACK from the application server 508 to the tethered device 504, same or similar modification may also occur to the traffic in the opposite direction. That is, a SYN-ACK from the tethered device 504 to the application server 508 may be modified in at least substantially similar manner as discussed herein to control the data traffic from the application server 508 to the tethered device 504.

Figure 6:
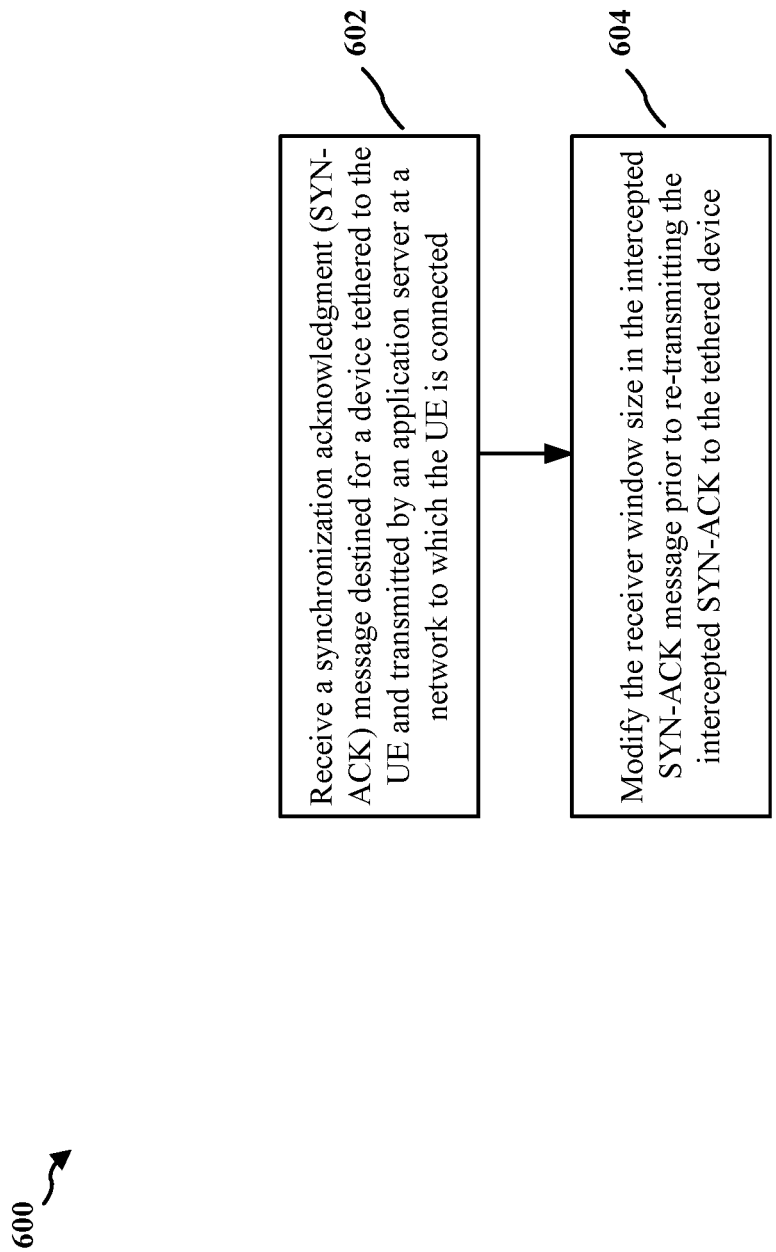
FIG. 6 is a flowchart of a method of wireless communication according to some aspects of the present disclosure.

FIG. 6 is a flow chart illustrating a method 600 of wireless communication. The method 600 may be performed by a UE and/or apparatus, such as the UE 104, the UE 204, the UE 350, the UE 400, the UE 502, the apparatus 702/702', which may include the memory 360 and which may be the entire UE 350 or a component of the UE 350 (e.g., the TX processor 368, the RX processor 356, and/or the controller/processor 359). The UE and/or apparatus may include at least a first layer, such as a PHY and/or MAC layer, and a second layer, such as an application layer. According to various aspects, one or more of the illustrated operations of the method 600 may be omitted, transposed, and/or contemporaneously performed. As illustrated, the method 600 includes a number of enumerated steps, but aspects of the method 600 may include additional steps before, after, and in between the enumerated steps. In some aspects, one or more of the enumerated steps may be omitted or performed in a different order.

In some aspects, at operation 602, a UE may receive a synchronization acknowledgment (SYN-ACK) message destined for a device tethered to the UE and transmitted by an application server at a network to which the UE is connected. In some aspects, the SYN-ACK message may include an application server receiver window size indicating available buffer space in a receive buffer of the application server.

In some aspects, at operation 604, the UE may modify the receiver window size in the received SYN-ACK message prior to re-transmitting (e.g., forwarding, transmitting, communicating, etc.) the received SYN-ACK to the tethered device.

In some aspects, the UE may further determine that an amount of data transmitted by the tethered device to the application server via the UE exceeds an uplink (UL) buffer threshold of the UE, for instance, prior to the modifying the receiver window size. In some aspects, modifying the application receiver window size includes reducing the application receiver window size to less than or equal to the UL buffer threshold of the UE.

In some aspects, the UE may further monitor, prior to the modifying the receiver window size, a round trip time (RTT) of a communication cycle between the application server and the tethered device. In some aspects, the communication cycle may include data being transmitted by the application server via the UE to the tethered device and an acknowledgement being received at the application server after transmission via the UE by the tethered device in response to the data being received at the tethered device. In some aspects, the UE may determine that the RTT is increasing over time.

In some aspects, the UE may receive a synchronization (SYN) message destined for the application server via the UE and transmitted by the tethered device to establish a transmission control protocol (TCP) connection with the network. In some aspects, the SYN may include a device receiver window size indicating a maximum amount of data the tethered device is configured to receive and buffer.

In some aspects, the device tethered to the UE can be a personal computer tethered to the UE via a communication link including a universal serial bus (USB) cable, an ethernet cable, a Bluetooth® connection or a Wi-Fi® connection.

Figure 7:
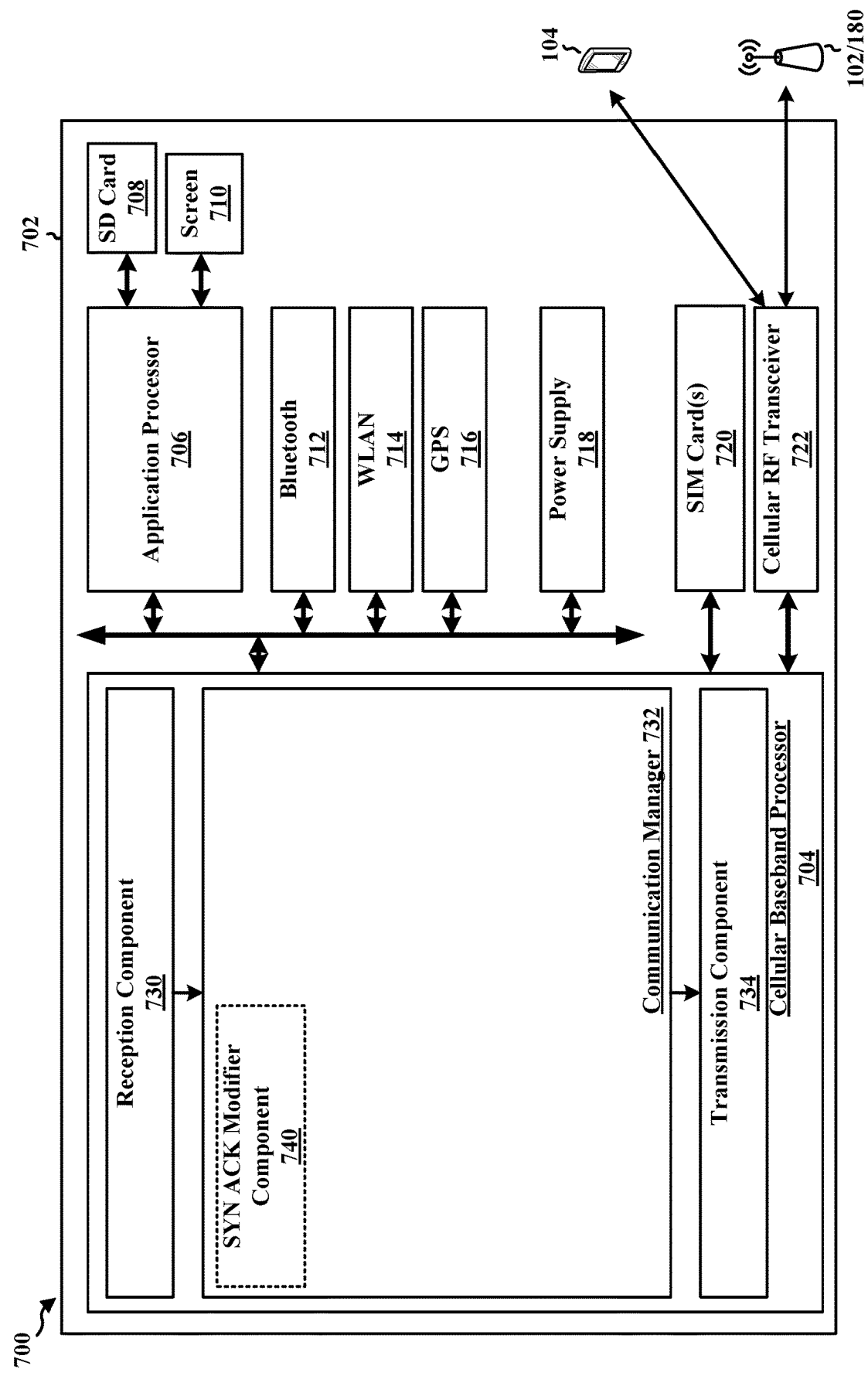
FIG. 7 is a diagram illustrating an example hardware implementation for a UE employing a processing system according to some aspects of the present disclosure.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforementioned additional modules of the apparatus 702.

The communication manager 732 includes a SYN-ACK modifier component 740 that is configured to receive a synchronization acknowledgment (SYN-ACK) message destined for a device tethered to the UE and transmitted by an application server at a network to which the UE is connected, e.g., as described in connection with 602 of FIG. 6. In some aspects, the SYN-ACK message includes an application server receiver window size indicating available buffer space in a receive buffer of the application server. Further, the SYN-ACK modifier component 740 may be configured to modify the receiver window size in the received SYN-ACK message prior to re-transmitting (e.g., forwarding, transmitting, communicating, etc.) the received SYN-ACK to the tethered device, e.g., as described in connection with 604 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving a synchronization acknowledgment (SYN-ACK) message destined for a device tethered to the UE and transmitted by an application server at a network to which the UE is connected. In some aspects, the SYN-ACK message includes an application server receiver window size indicating available buffer space in a receive buffer of the application server. The apparatus includes means for modifying the receiver window size in the received SYN-ACK message prior to re-transmitting (e.g., forwarding, transmitting, communicating, etc.) the received SYN-ACK to the tethered device.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

RECITATIONS OF SOME ASPECTS OF THE PRESENT DISCLOSURE

Aspect 1: A method of wireless communication performed by a user equipment (UE), the method comprising: receiving a synchronization acknowledgment (SYN-ACK) message destined for a device tethered to the UE and transmitted by an application server at a network to which the UE is connected, the SYN-ACK message including an application server receiver window size indicating available buffer space in a receive buffer of the application server; and modifying the application server receiver window size in the received SYN-ACK message prior to transmitting the received SYN-ACK to the tethered device.

Aspect 2: The method of aspect 1, further comprising determining, prior to the modifying the receiver window size, that an amount of data transmitted by the tethered device to the application server via the UE exceeds an uplink (UL) buffer threshold of the UE.

Aspect 3: The method of aspect 2, wherein modifying the application receiver window size includes reducing the application receiver window size to less than or equal to the UL buffer threshold of the UE.

Aspect 4: The method of any of aspects 1-3, further comprising: prior to the modifying the receiver window size, monitoring a round trip time (RTT) of a communication cycle between the application server and the tethered device, a communication cycle including data being transmitted by the application server via the UE to the tethered device and an acknowledgement being received at the application server after transmission via the UE by the tethered device in response to the data being received at the tethered device; and determining that the RTT is increasing over time.

Aspect 5: The method of any of aspects 1-4, further comprising receiving a synchronization (SYN) message destined for the application server via the UE and transmitted by the tethered device to establish a transmission control protocol (TCP) connection with the network, the SYN including a tethered device receiver window size indicating a maximum amount of data the tethered device is configured to receive and buffer.

Aspect 6: The method of any of aspects 1-5, wherein the device tethered to the UE is a personal computer tethered to the UE via a communication link including a universal serial bus (USB) cable, an ethernet cable, a Bluetooth® connection or a Wi-Fi® connection.

Aspect 7: A user equipment (UE), comprising: a memory; a processor coupled to the memory; and a transceiver coupled to the processor, the UE configured to perform the methods of aspects 1-6.

Aspect 8: A user equipment (UE) comprising means for performing the methods of aspects 1-6.

Aspect 9: A non-transitory computer-readable medium (CRM) having program code recorded thereon, the program code comprises code for causing a UE to perform the methods of aspects 1-6.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   receiving a synchronization acknowledgment (SYN-ACK) message destined for a device tethered to the UE and transmitted by an application server at a network to which the UE is connected,
   the SYN-ACK message including an application server receiver window size indicating available buffer space in a receive buffer of the application server; and
   modifying the application server receiver window size in the received SYN-ACK message prior to transmitting the received SYN-ACK message to the device tethered to the UE.

2. The method of claim 1, further comprising determining, prior to the modifying the application server receiver window size, that an amount of data transmitted by the device tethered to the UE to the application server via the UE exceeds an uplink (UL) buffer threshold of the UE.

3. The method of claim 1, wherein modifying the application server receiver window size includes reducing the application server receiver window size to less than or equal to an uplink (UL) buffer threshold of the UE.

4. The method of claim 1, further comprising:
   prior to the modifying the application server receiver window size:
   monitoring a round trip time (RTT) of a communication cycle between the application server and the device tethered to the UE, wherein the communication cycle includes data being transmitted by the application server via the UE to the device tethered to the UE and an acknowledgement being received at the application server after transmission via the UE by the device tethered to the UE in response to the data being received at the device tethered to the UE; and
   determining that the RTT is increasing over time.

5. The method of claim 1, further comprising receiving a synchronization (SYN) message destined for the application server via the UE and transmitted by the device tethered to the UE to establish a transmission control protocol (TCP) connection with the network, the SYN including a tethered device receiver window size indicating a maximum amount of data the device tethered to the UE is configured to receive and buffer.

6. The method of claim 1, wherein the device tethered to the UE is tethered to the UE via a communication link including a universal serial bus (USB) cable, an ethernet cable, a Bluetooth® connection or a Wi-Fi® connection.

7. The method of claim 1, further comprising transmitting, to the device tethered to the UE, the received SYN-ACK message including the modified application server receiver window size.

8. A user equipment (UE), comprising:
a memory;
a transceiver; and
at least one processor coupled to the memory and the transceiver, the transceiver configured to:
receive a synchronization acknowledgment (SYN-ACK) message destined for a device tethered to the UE and transmitted by an application server at a network to which the UE is connected,
the SYN-ACK message including an application server receiver window size indicating available buffer space in a receive buffer of the application server; and
the at least one processor configured to:
modify the application server receiver window size in the received SYN-ACK message prior to transmitting the received SYN-ACK message to the device tethered to the UE.

9. The UE of claim 8, wherein the at least one processor is further configured to determine, prior to modifying the application server receiver window size, that an amount of data transmitted by the device tethered to the UE to the application server via the UE exceeds an uplink (UL) buffer threshold of the UE.

10. The UE of claim 8, wherein the at least one processor is configured to modify the application server receiver window size by reducing the application server receiver window size to less than or equal to an uplink (UL) buffer threshold of the UE.

11. The UE of claim 8, wherein the at least one processor is further configured to:
prior to modifying the application server receiver window size:
monitor a round trip time (RTT) of a communication cycle between the application server and the device tethered to the UE, wherein the communication cycle includes data being transmitted by the application server via the UE to the device tethered to the UE and an acknowledgement being received at the application server after transmission via the UE by the device tethered to the UE in response to the data being received at the device tethered to the UE; and
determine that the RTT is increasing over time.

12. The UE of claim 8, wherein the at least one processor is further configured to receive a synchronization (SYN) message destined for the application server via the UE and transmitted by the device tethered to the UE to establish a transmission control protocol (TCP) connection with the network,
the SYN including a device receiver window size indicating a maximum amount of data the device tethered to the UE is configured to receive and buffer.

13. The UE of claim 8, wherein the device tethered to the UE is tethered to the UE via a communication link including a universal serial bus (USB) cable, an ethernet cable, a Bluetooth® connection or a Wi-Fi® connection.

14. The UE of claim 8, wherein the at least one processor is further configured to transmit, to the device tethered to the UE, the received SYN-ACK message including the modified application server receiver window size.

15. A non-transitory computer-readable medium (CRM) having program code recorded thereon for wireless communication by a user equipment (UE), the program code comprising:
code for causing the UE to receive a synchronization acknowledgment (SYN-ACK) message destined for a device tethered to the UE and transmitted by an application server at a network to which the UE is connected,
the SYN-ACK message including an application server receiver window size indicating available buffer space in a receive buffer of the application server; and
code for causing the UE to modify the application server receiver window size in the received SYN-ACK message prior to transmitting the received SYN-ACK message to the device tethered to the UE.

16. The non-transitory CRM of claim 15, wherein the program code further comprises code for causing the UE to determine, prior to modifying the application server receiver window size, that an amount of data transmitted by the device tethered to the UE to the application server via the UE exceeds an uplink (UL) buffer threshold of the UE.

17. The non-transitory CRM of claim 15, wherein the code for causing the UE to modify the application server receiver window size causes the UE to reduce the application server receiver window size to less than or equal to an uplink (UL) buffer threshold of the UE.

18. The non-transitory CRM of claim 15, wherein the program code further comprises code for causing the UE to:
prior to the modifying the receiver window size:
monitor a round trip time (RTT) of a communication cycle between the application server and the device tethered to the UE prior to the modifying the receiver window size, wherein the communication cycle includes second data being transmitted by the application server via the UE to the device tethered to the UE and an acknowledgement being received at the application server after transmission via the UE by the device tethered to the UE in response to the data being received at the device tethered to the UE; and
determine that the RTT is increasing over time.

19. The non-transitory CRM of claim 15, wherein the program code further comprises code for causing the UE to receive a synchronization (SYN) message destined for the application server via the UE and transmitted by the device tethered to the UE to establish a transmission control protocol (TCP) connection with the network,
the SYN including a device receiver window size indicating a maximum amount of data the device tethered to the UE is configured to receive and buffer.

20. The non-transitory CRM of claim 15, wherein the device tethered to the UE is tethered to the UE via a communication link including a universal serial bus (USB) cable, an ethernet cable, a Bluetooth® connection or a Wi-Fi® connection.

21. The non-transitory CRM of claim 15, wherein the program code further comprises code for causing the UE to transmit, to the device tethered to the UE, the received SYN-ACK message including the modified application server receiver window size.

22. A user equipment (UE), comprising:
means for receiving a synchronization acknowledgment (SYN-ACK) message destined for a device tethered to the UE and transmitted by an application server at a network to which the UE is connected,
the SYN-ACK message including an application server receiver window size indicating available buffer space in a receive buffer of the application server; and
means for modifying the application server receiver window size in the received SYN-ACK message prior to transmitting the received SYN-ACK message to the device tethered to the UE.

23. The UE of claim 22, further comprising means for determining, prior to the modifying the application server receiver window size, that an amount of data transmitted by the device tethered to the UE to the application server via the UE exceeds an uplink (UL) buffer threshold of the UE.

24. The UE of claim 22, wherein the means for modifying the application server receiver window size includes means for reducing the application server receiver window size to less than or equal to an uplink (UL) buffer threshold of the UE.

25. The UE of claim 22, further comprising:
means for monitoring, prior to the modifying the receiver window size, a round trip time (RTT) of a communication cycle between the application server and the device tethered to the UE, wherein the communication cycle includes data being transmitted by the application server via the UE to the tethered device and an acknowledgement being received at the application server after transmission via the UE by the device tethered to the UE in response to the data being received at the device tethered to the UE; and
means for determining that the RTT is increasing over time.

26. The UE of claim 22, further comprising means for receiving a synchronization (SYN) message destined for the application server via the UE and transmitted by the device tethered to the UE to establish a transmission control protocol (TCP) connection with the network,
the SYN including a device receiver window size indicating a maximum amount of data the device tethered to the UE is configured to receive and buffer.

27. The UE of claim 22, wherein the device tethered to the UE is tethered to the UE via a communication link including a universal serial bus (USB) cable, an ethernet cable, a Bluetooth® connection or a Wi-Fi® connection.

28. The UE of claim 22, further comprising means for transmitting, to the device tethered to the UE, the received SYN-ACK message including the modified application server receiver window size.

* * * * *